United States Patent
Gongloor et al.

(10) Patent No.: US 10,621,064 B2
(45) Date of Patent: Apr. 14, 2020

(54) PROACTIVE IMPACT MEASUREMENT OF DATABASE CHANGES ON PRODUCTION SYSTEMS

(71) Applicant: Oracle International Corporation, Redwood Shores, CA (US)

(72) Inventors: Prabhaker Gongloor, San Jose, CA (US); Mughees Minhas, Palo Alto, CA (US); Khaled Yagoub, Newark, CA (US); George An, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 531 days.

(21) Appl. No.: 14/325,209

(22) Filed: Jul. 7, 2014

(65) Prior Publication Data
US 2016/0004621 A1    Jan. 7, 2016

(51) Int. Cl.
*G06F 11/34*      (2006.01)
*G06F 17/30*      (2006.01)
(Continued)

(52) U.S. Cl.
CPC ...... *G06F 11/3452* (2013.01); *G06F 11/3086* (2013.01); *G06F 11/3414* (2013.01); *G06F 16/217* (2019.01); *G06F 2201/80* (2013.01)

(58) Field of Classification Search
CPC ............. G06F 17/30306; G06F 16/217; G06F 16/2282; G06F 11/3409; G06F 2212/1016; G06Q 10/0639
See application file for complete search history.

(56) References Cited

U.S. PATENT DOCUMENTS

| | | |
|---|---|---|
| 4,769,772 A | 9/1988 | Dwyer |
| 4,803,614 A | 2/1989 | Banba et al. |

(Continued)

OTHER PUBLICATIONS

Yagoub, Khaled. "SQL Performance Analyzer" An Oracle Whitepaper. Oracle Corporation. 2007.*

(Continued)

*Primary Examiner* — Usmaan Saeed
*Assistant Examiner* — William P Bartlett
(74) *Attorney, Agent, or Firm* — Hickman Palermo Becker Bingham LLP

(57) ABSTRACT

Database change test system that includes an SQL performance analyzer (SPA) to efficiently test execute workload set of queries on a production or test database management system (DBMS) and report to a user the impact of database changes, is provided. Techniques are described that limit the resource consumption of test execution of workload set of queries, especially to enable such test execution on a production DBMS. A method and apparatus for storing in persistent storage query test profile that specifies query test restrictions and execution plan parameters, which indicate how to generate execution plan operators for query execution plans; storing a workload set of queries in persistent storage; establishing a session with a database management systems; retrieving the query test profile; configuring the session according to the test profile; receiving user input requesting to execute the workload set; and executing the queries according to the query test profile, is also provided.

24 Claims, 4 Drawing Sheets

(51) Int. Cl.
*G06F 11/30* (2006.01)
*G06F 16/21* (2019.01)

(56) References Cited

U.S. PATENT DOCUMENTS

| | | | |
|---|---|---|---|
| 4,829,427 A | 5/1989 | Green |
| 4,956,774 A | 9/1990 | Shibamiya et al. |
| 5,091,852 A | 2/1992 | Tsuchida et al. |
| 5,251,131 A | 10/1993 | Masand et al. |
| 5,287,459 A | 2/1994 | Gniewek |
| 5,301,317 A | 4/1994 | Lohman et al. |
| 5,315,580 A | 5/1994 | Phaal |
| 5,325,525 A | 6/1994 | Shan et al. |
| 5,339,429 A | 8/1994 | Tanaka et al. |
| 5,379,424 A | 1/1995 | Morimoto et al. |
| 5,412,804 A | 5/1995 | Krishna |
| 5,412,806 A | 5/1995 | Du et al. |
| 5,444,820 A | 8/1995 | Tzes et al. |
| 5,452,468 A | 9/1995 | Peterson |
| 5,459,837 A | 10/1995 | Caccavale |
| 5,469,560 A | 11/1995 | Beglin |
| 5,495,419 A | 2/1996 | Rostoker et al. |
| 5,495,606 A | 2/1996 | Borden et al. |
| 5,504,894 A | 4/1996 | Fegurson et al. |
| 5,537,588 A | 7/1996 | Engelmann et al. |
| 5,551,027 A | 8/1996 | Choy et al. |
| 5,572,640 A | 11/1996 | Schettler |
| 5,574,900 A | 11/1996 | Huang et al. |
| 5,590,319 A | 12/1996 | Cohen et al. |
| 5,642,515 A | 6/1997 | Jones et al. |
| 5,671,403 A | 9/1997 | Shekita et al. |
| 5,675,791 A | 10/1997 | Bhide et al. |
| 5,680,547 A | 10/1997 | Chang |
| 5,694,591 A | 12/1997 | Du et al. |
| 5,710,915 A | 1/1998 | McElhiney |
| 5,761,654 A | 6/1998 | Tow |
| 5,764,912 A | 6/1998 | Rosborough |
| 5,765,150 A | 6/1998 | Burrows |
| 5,787,251 A | 7/1998 | Hamilton et al. |
| 5,794,227 A | 8/1998 | Brown |
| 5,797,136 A | 8/1998 | Boyer et al. |
| 5,822,748 A | 10/1998 | Cohen et al. |
| 5,852,820 A | 12/1998 | Burrows |
| 5,857,180 A | 1/1999 | Hallmark et al. |
| 5,860,069 A | 1/1999 | Wright |
| 5,875,445 A | 2/1999 | Antonshenkov |
| 5,918,225 A | 6/1999 | White et al. |
| 6,002,669 A | 12/1999 | White |
| 6,003,022 A | 12/1999 | Eberhard et al. |
| 6,009,265 A | 12/1999 | Huang et al. |
| 6,026,390 A | 2/2000 | Ross et al. |
| 6,026,391 A | 2/2000 | Osborn et al. |
| 6,026,394 A | 2/2000 | Tsuchida et al. |
| 6,061,676 A | 5/2000 | Srivastava et al. |
| 6,205,451 B1 | 3/2001 | Norcott et al. |
| 6,289,335 B1 | 9/2001 | Downing et al. |
| 6,298,342 B1 | 10/2001 | Graefe et al. |
| 6,334,128 B1 | 12/2001 | Norcott et al. |
| 6,339,768 B1 | 1/2002 | Leung et al. |
| 6,353,826 B1 | 3/2002 | Seputis |
| 6,356,889 B1 | 3/2002 | Lohman et al. |
| 6,356,891 B1 | 3/2002 | Agrawal et al. |
| 6,370,524 B1 | 4/2002 | Witkowski |
| 6,430,550 B1 | 8/2002 | Leo et al. |
| 6,438,558 B1 | 8/2002 | Stegelmann |
| 6,438,562 B1 | 8/2002 | Gupta et al. |
| 6,526,526 B1 | 2/2003 | Dong et al. |
| 6,529,896 B1 | 3/2003 | Leung et al. |
| 6,529,901 B1 | 3/2003 | Chaudhuri et al. |
| 6,598,038 B1 | 7/2003 | Guay et al. |
| 6,615,222 B2 | 9/2003 | Hornibrook et al. |
| 6,684,203 B1 | 1/2004 | Waddington et al. |
| 6,694,306 B1 | 2/2004 | Nishizawa et al. |
| 6,807,546 B2 | 10/2004 | Young-Lai |
| 6,901,405 B1 | 5/2005 | McCrady et al. |
| 6,934,699 B1 | 8/2005 | Haas et al. |
| 6,941,360 B1 | 9/2005 | Srivastava et al. |
| 6,954,776 B1 | 10/2005 | Cruanes et al. |
| 6,961,729 B1 | 11/2005 | Toohey et al. |
| 6,980,988 B1 | 12/2005 | Demers et al. |
| 6,990,503 B1 | 1/2006 | Luo et al. |
| 7,007,007 B2 | 2/2006 | Slutz |
| 7,089,225 B2 | 8/2006 | Li et al. |
| 7,139,749 B2 | 11/2006 | Bossman et al. |
| 7,155,428 B1 | 12/2006 | Brown et al. |
| 7,155,459 B2 | 12/2006 | Chaudhuri et al. |
| 7,185,000 B1 | 2/2007 | Brown et al. |
| 7,194,452 B2 | 3/2007 | Galindo-Legaria et al. |
| 7,234,112 B1 | 6/2007 | Brown et al. |
| 7,246,108 B2 | 7/2007 | Ahmed |
| 7,305,410 B2 | 12/2007 | Skopec et al. |
| 7,337,169 B2 | 2/2008 | Galindo-Legaria et al. |
| 7,383,247 B2 | 6/2008 | Li et al. |
| 7,406,477 B2 | 7/2008 | Farrar et al. |
| 7,499,907 B2 | 3/2009 | Brown et al. |
| 7,526,508 B2 | 4/2009 | Tan et al. |
| 7,647,293 B2 | 1/2010 | Brown et al. |
| 7,664,730 B2 | 2/2010 | Ziauddin et al. |
| 7,747,606 B2 | 6/2010 | Dageville et al. |
| 7,805,411 B2 | 9/2010 | Ziauddin et al. |
| 7,890,491 B1 | 2/2011 | Simmen |
| 7,966,313 B2 | 6/2011 | Bruno et al. |
| 7,970,755 B2 | 6/2011 | Belknap et al. |
| 8,019,750 B2 | 9/2011 | Kosciusko et al. |
| 8,180,762 B2 | 5/2012 | Steinbach et al. |
| 8,312,000 B1* | 11/2012 | Burger .............. G06F 17/30463 |
| | | 707/706 |
| 8,386,450 B2 | 2/2013 | Simmen |
| 2001/0047372 A1 | 11/2001 | Gorelik et al. |
| 2002/0038313 A1 | 3/2002 | Klein et al. |
| 2002/0099521 A1 | 7/2002 | Yang et al. |
| 2002/0138376 A1 | 9/2002 | Hinkle |
| 2002/0188600 A1 | 12/2002 | Lindsay et al. |
| 2003/0033291 A1 | 2/2003 | Harris |
| 2003/0065644 A1 | 4/2003 | Horman et al. |
| 2003/0088541 A1 | 5/2003 | Zilio et al. |
| 2003/0093408 A1 | 5/2003 | Brown et al. |
| 2003/0115212 A1 | 6/2003 | Hornibrook et al. |
| 2003/0135480 A1 | 7/2003 | Van Arsdale et al. |
| 2003/0159136 A1 | 8/2003 | Huang et al. |
| 2003/0182276 A1 | 9/2003 | Bossman et al. |
| 2003/0212647 A1 | 11/2003 | Bangel et al. |
| 2003/0212668 A1 | 11/2003 | Hinshaw et al. |
| 2003/0229639 A1 | 12/2003 | Carlson et al. |
| 2004/0003004 A1 | 1/2004 | Chaudhuri et al. |
| 2004/0015600 A1 | 1/2004 | Tiwary et al. |
| 2004/0181521 A1 | 9/2004 | Simmen |
| 2004/0205062 A1 | 10/2004 | Brown et al. |
| 2004/0220911 A1 | 11/2004 | Zuzarte et al. |
| 2004/0244031 A1 | 12/2004 | Martinez |
| 2005/0028134 A1 | 2/2005 | Zane et al. |
| 2005/0055382 A1 | 3/2005 | Ferrat et al. |
| 2005/0086175 A1 | 4/2005 | Tan et al. |
| 2005/0119999 A1* | 6/2005 | Zait ................ G06F 16/217 |
| 2005/0120000 A1 | 6/2005 | Ziauddin et al. |
| 2005/0125393 A1 | 6/2005 | Yagoub et al. |
| 2005/0125427 A1 | 6/2005 | Dageville et al. |
| 2005/0125452 A1 | 6/2005 | Ziauddin et al. |
| 2005/0138015 A1 | 6/2005 | Dageville et al. |
| 2005/0165741 A1 | 7/2005 | Gordon |
| 2005/0177557 A1 | 8/2005 | Ziauddin et al. |
| 2005/0177971 A1 | 8/2005 | Porco |
| 2005/0187917 A1 | 8/2005 | Lawande et al. |
| 2005/0187971 A1 | 8/2005 | Hassan et al. |
| 2005/0198013 A1 | 8/2005 | Cunningham et al. |
| 2005/0203933 A1 | 9/2005 | Chaudhuri et al. |
| 2005/0203940 A1 | 9/2005 | Farrar et al. |
| 2005/0234965 A1 | 10/2005 | Rozenshtein et al. |
| 2005/0262060 A1 | 11/2005 | Rohwedder et al. |
| 2005/0278357 A1 | 12/2005 | Brown et al. |
| 2005/0278577 A1 | 12/2005 | Doong et al. |
| 2005/0283458 A1 | 12/2005 | Galindo-Legaria et al. |
| 2005/0283471 A1 | 12/2005 | Rafi |
| 2006/0026115 A1 | 2/2006 | Ahmed |

(56) References Cited

U.S. PATENT DOCUMENTS

| | | |
|---|---|---|
| 2006/0026133 A1 | 2/2006 | Ahmed |
| 2006/0031200 A1 | 2/2006 | Santosuosso |
| 2006/0036989 A1 | 2/2006 | Chaudhuri et al. |
| 2006/0041537 A1 | 2/2006 | Rafi |
| 2006/0085378 A1 | 4/2006 | Raizman et al. |
| 2006/0085484 A1 | 4/2006 | Raizman et al. |
| 2006/0129542 A1 | 6/2006 | Hinshaw et al. |
| 2006/0195416 A1 | 8/2006 | Ewen et al. |
| 2006/0212428 A1 | 9/2006 | Nelson |
| 2006/0218123 A1 | 9/2006 | Chowdhuri et al. |
| 2007/0038595 A1 | 2/2007 | Ghosh et al. |
| 2007/0038618 A1 | 2/2007 | Kosciusko et al. |
| 2007/0061379 A1 | 3/2007 | Wong et al. |
| 2007/0078825 A1 | 4/2007 | Bornhoeved et al. |
| 2007/0083500 A1 | 4/2007 | Zibitsker |
| 2007/0136383 A1 | 6/2007 | Steinbach et al. |
| 2007/0214104 A1 | 9/2007 | Miao et al. |
| 2008/0010240 A1 | 1/2008 | Zait |
| 2008/0040196 A1 | 2/2008 | Coon et al. |
| 2008/0052271 A1 | 2/2008 | Lam |
| 2008/0077348 A1 | 3/2008 | Hildebrand et al. |
| 2008/0098003 A1 | 4/2008 | Dias et al. |
| 2008/0114718 A1 | 5/2008 | Anderson et al. |
| 2008/0126393 A1 | 5/2008 | Bossman et al. |
| 2008/0168058 A1 | 7/2008 | Gordon |
| 2008/0178079 A1 | 7/2008 | Chen et al. |
| 2008/0215536 A1 | 9/2008 | Day et al. |
| 2008/0228710 A1 | 9/2008 | Muras |
| 2008/0235183 A1 | 9/2008 | Draese et al. |
| 2009/0006445 A1 | 1/2009 | Shemenzon et al. |
| 2009/0018992 A1 | 1/2009 | Zuzarte et al. |
| 2009/0037923 A1 | 2/2009 | Smith et al. |
| 2009/0077016 A1* | 3/2009 | Belknap ............ G06F 17/30306 |
| 2009/0077017 A1 | 3/2009 | Belknap et al. |
| 2009/0327214 A1 | 12/2009 | Richardson et al. |
| 2009/0327254 A1 | 12/2009 | Bruno et al. |
| 2010/0005097 A1* | 1/2010 | Liang .................. G06F 11/3414 707/E17.032 |
| 2010/0005340 A1 | 1/2010 | Belknap et al. |

OTHER PUBLICATIONS

Belknap, Peter, et al. "Self-tuning for SQL performance in Oracle database 11g." 2009 IEEE 25th International Conference on Data Engineering. IEEE, 2009.*
Ashdown, Lance, et al. "Oracle Database Performance Tuning Guide, 12c Release 1 (12.1) E15857-15." (2013).*
Chan, Oracle® Database Real Application Testing User's Guide 11g Release 2 (11.2), Dec. 2011.*
U.S. Appl. No. 12/188,975, filed Aug. 8, 2008, Notice of Allowance, dated Jul. 24, 2014.
Dageville et al., "Automatic SQL Tuning in Oracle 10g", In Proceedings of the Thirteenth International Conference on Very Large Databases, vol. 30, dated 2004, 12 pages.
Arawal et al., "Database Tuning Advisor for Microsoft SQL Server 2005: Demo", In Proceedings of the 2005 ACM Sigmod International Conference on Management of Data, dated 2005, 3 pages.
Agrawal et al., "Automated Selection of Materialized Views and Indexex for SQL Databases", In Proceedings of the 26th International Conference on the Very Large Databases, dated 2000, 10 pages.
U.S. Appl. No. 11/484,108, filed Jul. 10, 2006, Office Action, dated Jun. 8, 2009.
U.S. Appl. No. 11/484,108, filed Jul. 10, 2006, Final Office Action, dated Dec. 17, 2009.
U.S. Appl. No. 11/484,108, filed Jul. 10, 2005, Interview Summary, dated Feb. 23, 2010.
U.S. Appl. No. 11/484,108, filed Jul. 10, 2006, Office Action, dated May 10, 2010.
U.S. Appl. No. 11/484,108, filed Jul. 10, 2006, Notice of allowance, dated Oct. 4, 2010.

U.S. Appl. No. 12/188,981, filed Aug. 8, 2008, Office Action, dated Nov. 23, 2010.
U.S. Appl. No. 12/188,662, filed Aug. 8, 2008, Office Action, dated Feb. 24, 2011.
U.S. Appl. No. 12/188,683, filed Aug. 8, 2008, Office Action, dated Mar. 30, 2011.
U.S. Appl. No. 12/188,678, filed Aug. 8, 2008, Office Action, dated Apr. 25, 2011.
U.S. Appl. No. 12/188,673, filed Aug. 8, 2008, Office Action, dated May 5, 2011.
U.S. Appl. No. 12/188,981, filed Aug. 8, 2008, Final Office Action, dated Jun. 7, 2011.
U.S. Appl. No. 12/188,662, filed Aug. 8, 2008, Office Action, dated Jul. 13, 2011.
U.S. Appl. No. 12/188,678, filed Aug. 8, 2008, Final Office Action, dated Oct. 13, 2011.
U.S. Appl. No. 12/188,673, filed Aug. 8, 2008, Final Office Action, dated Dec. 22, 2011.
U.S. Appl. No. 12/188,981, filed Aug. 8, 2008, Office Action, dated Feb. 21, 2012.
U.S. Appl. No. 12/188,673, filed Aug. 8, 2008, Advisory Action, dated Mar. 23, 2011.
U.S. Appl. No. 12/188,981, filed Aug. 8, 2008, Notice of Allowance, dated Aug. 17, 2012.
U.S. Appl. No. 12/188,673, filed Aug. 8, 2008, Notice of Allowance, dated Sep. 18, 2012.
U.S. Appl. No. 12/188,662, filed Aug. 8, 2008, Notice of Allowance, dated Sep. 26, 2013.
U.S. Appl. No. 12/188,975, filed Aug. 8, 2008, Office Action, dated Nov. 29, 2010.
U.S. Appl. No. 12/188,975, filed Aug. 8, 2008, Final Office Action, dated May 9, 2011.
U.S. Appl. No. 12/188,975, filed Aug. 8, 2008, Office Action, dated Dec. 21, 2011.
U.S. Appl. No. 12/188,975, filed Aug. 8, 2008, Final Office Action, dated May 14, 2012.
U.S. Appl. No. 12/188,975, filed Aug. 8, 2008, Office Action, dated May 17, 2013.
U.S. Appl. No. 12/188,975, filed Aug. 8, 2008, Final Office Action, dated Oct. 17, 2013.
U.S. Appl. No. 12/188,975, filed Aug. 8, 2008, Final Office Action, dated Dec. 24, 2013.
U.S. Appl. No. 12/188,975, filed Aug. 8, 2008, Advisory Action, dated Feb. 6, 2014.
U.S. Appl. No. 12/188,975, filed Aug. 8, 2008, Interview Summary, dated Dec. 17, 2013.
U.S. Appl. No. 12/188,975, filed Aug. 8, 2008, Interview Summary, dated Jan. 17, 2014.
Gopalkrishnand, Vivikanand, et al. "Issues of Object-Relational View Design in Data Warehousing Environment," IEEE 1998, 0780347781, pp. 2732-2737.
Kung, Chenho, "Object Subclass Hierarchy in SQL: A Simple Approach," Communications of the AC, Jul. 1990, vol. 33, No. 7, pp. 117-125.
Bello, Randall G. et al. "Materialized Views in Oracle," VLDB '98, Proceedings of 24th International Conference on Very Large Data Bases, Aug. 24-27, 1998, New York City, New York, USA, pp. 659-664.
Najjar, Faiza et al. "Cardinality estimation of distributed join queries," Sep. 1-3, 1999; Database and Expert Systems Applications, 1999, Proceedings, Tenth International Workshop on, pp. 66-70.
Moro, Gianluca et al. "Incremental maintenance of multi-source views," Database Conference, 2001, ADC 2001, Proceedings, 12th Australasian, Jan. 2001, pp. 13-20.
Ahmed, Rafi, et al., "Cost-Based Query Transformation in Oracle," Copyright 2006 VLDB, ACM 1595933859, pp. 1026-1036.
Oracle® Database Performance Tuning Guide 10g Release 2 (10.2) "Using Plan Stability" pp. 18-1 to 18-10, 10gR2 released Jul. 11, 2005.
Bergsten, et al., "Prototyping DBS3 a Shared-Memory Parallel Database System", IEEE 818622954, 226-234, 1991, pp. 226-234.

(56) References Cited

OTHER PUBLICATIONS

Bhide, Anupam, "An Analysis of Three Transaction Processing Architectures", Computer Science Division, UC Berkeley, Proceeding of the 14$^{th}$ VLDB Conference,1998, pp. 339-350.
Copeland, George et al., "Data Placement in Bubba," ACM 0897912683, 1988, pp. 99-108.
Dayal, Umeshwar, "Of Nests and Trees: A Unified Approach to Processing Queries That Contain Nested Subqueries, Aggregates and Quantifiers", Proceedings of the 13$^{th}$ VLDB Conference, Brighton 1987, pp. 197-208.
Dewitt, et al., "A Performance Analysis of the Gamma Database Machine," Computer Sciences Department, University of Wisconsin, 1988, pp. 350-360.
Englert, Susan et al., "A Benchmark of NonStop SQL Release 2 Demonstrating Near-Linear Speedup and Scaleup on Large Databases", Technical Report 89.4, Tandem Part No. 27469, May 1989, 32 pages.
Graefe, Goetz, "Encapsulation of Parallelism in the Volcano Query Processing System," Mar. 1990, 14 pages.
Hirano, et al., "Load Balancing Algorithm for Parallel Processing on Shared Memory Multiprocessor", IEEE, pp. 210-217, 1991.
Hong, et al., "Optimization of Parallel Query Execution Plans in XPRS", Proceedings of the First International Conference on Parallel and Distributed Information Systems, IEEE, 1991, 8 pages.
Leverenz et al., "Oracle 8i Concepts Release 8.1.5-A67781-01", Oracle Corporation, Feb. 1999, located on the internet at <http://www.csee.umbc.edu/help/oracle8/server.815/a67781/toc.htm>, 122 pages.
Lumpkin, George et al., "Query Optimization in Oracle 9i", Oracle Corporation, Oracle White Paper, Feb. 2002, pp. 1-30.
Pirahesh, Hamid, et al., "Extensible/Rule Base Query Rewrite Optimization in Starburst", IBM Almaden Research Center, ACM, Sigmod, dated 1992, 10 pages.
Selinger, P. Griffiths, et al., "Access Path Selection in a Relational Database Management System", Proceedings of the 1979 ACM SIGMOD International Conference on the Management of Data, 1979, pp. 23-34.
Stonebraker, Michael, et al. "The Design of XPRS," Proceedings of the 14$^{th}$ VLDB Conference, 1988, pp. 318-330.
Tandem, "A Benchmark of NonStop SQL on the Debit Credit Transaction", The Tandem Performance Group, 1988, 26 pages.
Borla-Salamet, Pascale, "Compiling Control into Database Queries for Parallel Execution Management," IEEE Conference on Parallel Distributed Information Systems, 1991, ISBN 0-8186-2295-4, pp. 271-279.
Chaudhuri, Surajit et al., "Including Group-By in Query Optimization," Proceedings of the 20$^{th}$ VLDB Conference—1994, pp. 354-366.
Galindo-Legaria, Cesar et al., "Outerjoin Simplification and Reordering for Query Optimization," ACM Transactions on Database Systems, vol. 22, No. 1, Mar. 1997, pp. 43-74.
Erickson, Gail et al., "Improving Performance with SQL Server 2000 Indexed Views," Microsoft TechNet, Sep. 2000, located on the internet at http://www.microsoft.com/technet/prodtechnol/sql/2000/maintain/indexvw.mspx?pf=true, retrieved on Nov. 11, 2006, 10 pages.
Mishra, Priti et al., "Join Processing in Relational Databases," ACM Computing Surveys, vol. 24, No. 1, Mar. 1992, pp. 63-113.
Seshadri, Preveen, "Cost-Based Optimization for Magic: Algebra and Implementation," SIGMOND '96, 1996 ACM 0-89791-794-4, pp. 435-446.
Deutsch, Alin et al., "Minimization and Group-By Detection for Nested XQueries", University of California, San Diego, 2003, 15 pages.
Dehaan, David, "A Rewriting Algorithm for Multi-Block Aggregation Queries and Views using Prerequisites and Compensations", University of Waterloo, Canada, Technical Report CS-2004-25, May 3, 2004, 39 pages.
Chaudhuri, Surajit, "An Overview of Query Optimization in Relational Systems", Microsoft Research, 1998, 10 pages.
Muralikrishna, M., "Improved Unnesting Algorithms for Join Aggregate SQL Queries", VLDB Conference, Canada, 1992, 12 pages.
Hayu, John, "Analytic SQL Features in Oracle9i", An Oracle Technical White Paper, Dec. 2001, 32 pages.

* cited by examiner

PROACTIVE IMPACT MEASUREMENT OF DATABASE CHANGES ON PRODUCTION SYSTEMS

FIELD OF THE INVENTION

The present invention relates to the field of electronic database management.

BACKGROUND

One of the most important tasks performed by users of a database management system, such as database administrators (DBAs), is to provide stable performance in the presence of changes to the database system. When these changes are made to the database system, DBAs must ensure that the database system performance and end-user satisfaction will not regress. This task is, however, a challenging and time-consuming one because of the difficulty in predicting, the impact of a change on the performance of a production database system before actually implementing the change on the production database system.

Furthermore, database changes may not be easily tested on a production database system. First, applying database changes, even temporarily, to the production database system has a high risk of modifying execution plans for production queries. Since any modification of an execution plan of a query may lead to a degradation in performance of the query, DBAs generally prefer to avoid introducing such a risk for the purpose of testing database changes. Secondly, test executing queries on the production database system takes away system resources from production execution of queries and thus negatively impacts production database system performance.

Alternatively, DBAs may prefer to test database changes on a test database system, which is a replica of a production database system. However, testing database changes on a test database system may not yield accurate results because it may be practically impossible to reproduce the exact environment of the production database system on the test database system due to in-flight transactions at any given time on a busy production system and inability to restart the database for capturing the workload due to the business critical nature of the system. Any difference between the production database system and the test database system may impact an execution plan for a query and thus, yield a different performance metric for a database change.

Therefore, there is a need for a process for measuring the impact to the performance of a database system on which changes have been made or at least, determinatively identify any possible miss-measurement of the impact. This process enables DBAs to foresee where performance may improve or deteriorate and allow the DBAs to take corrective actions to fix the regressions before implementing the changes to the production database system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings of certain embodiments in which like reference numerals refer to corresponding parts throughout the figures.

DETAILED DESCRIPTION

Figure 1:
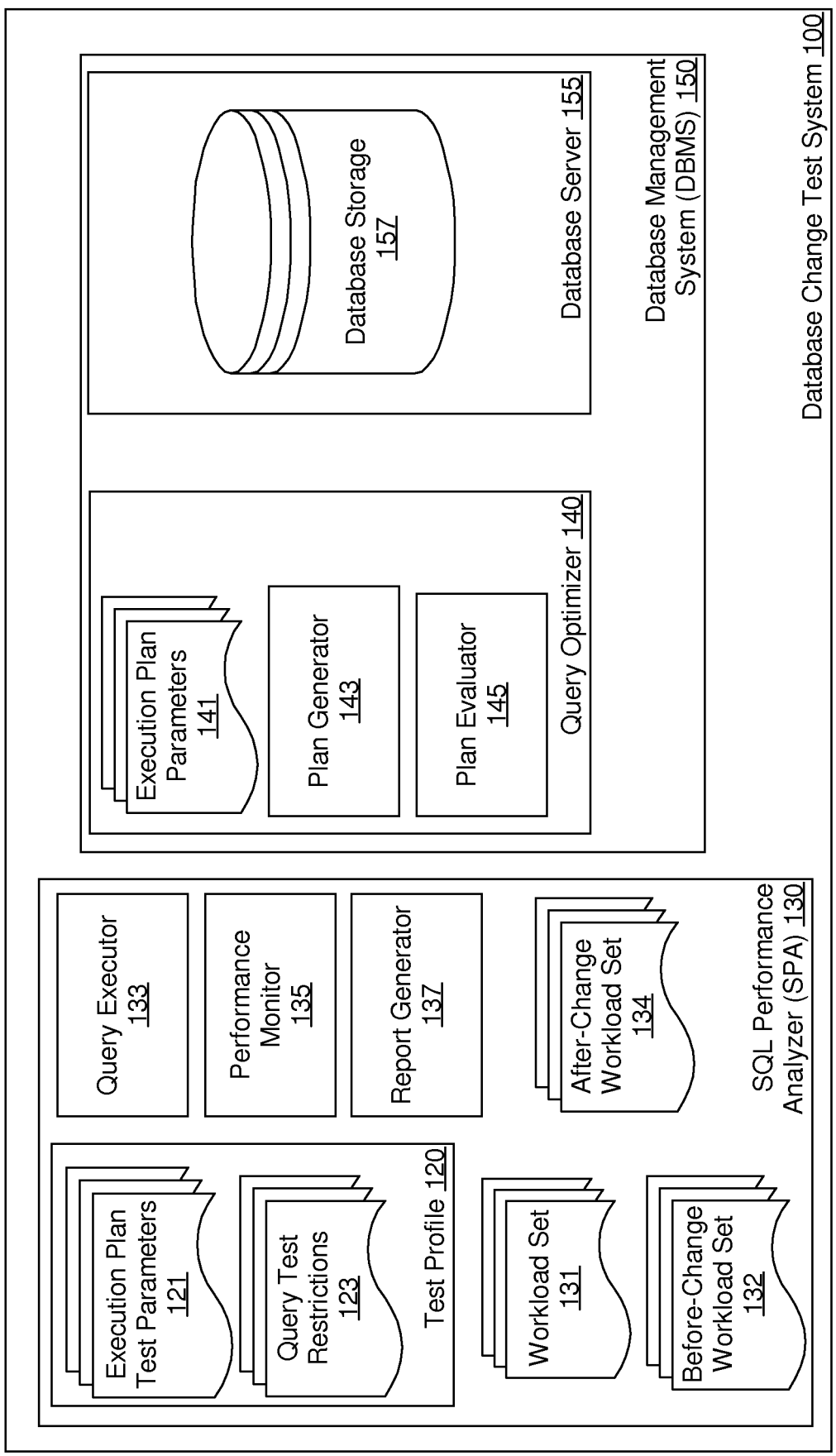
FIG. 1 is a system diagram that depicts database change test system, according to an embodiment.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

To effectively test the impact of database changes on execution of queries on a database system, database change test system needs to provide a user of the database system with a convenient and accurate way to collect performance metrics of a workload set of queries on a production or test database system. When a change occurs on a database system, the change may affect not only the query for which the change was made but other queries that may run on the changed database system. Database change test system may be utilized to do a quick assessment of the impact of database changes to any number of queries. The set of queries, for which the measurements of the impact are assessed, is referred herein as a "workload set" and is described in detail hereafter.

Database change test system may test execute a workload set of queries with and without database changes. As used herein, "test executing" refers to executing a query with or without making a database change for the purpose of collecting execution statistics about the execution of the workload set. While test executing the workload set with database changes made, the database change test system may simulate the database changes without actually committing them to a database system. By collecting various performance metrics during the test executions of the workload set before and after the database changes, database change test system may accurately report the impact of the database changes without actually committing the database changes to the database system.

To provide DBAs with accurate information on the impact, database change test system may also report on any modifications in execution plans of queries in the workload set before and after the database changes. Furthermore, the database change test system may also compare a before database change execution plans with original execution plans of queries in the workload set, where the original execution plans were obtained during a production execution of queries at the time of collecting the queries into the workload set. For modified execution plan queries, database change test system may determinatively identify that those queries were impacted because of the database system differences between the production database system and the test database system.

Furthermore, to minimize the performance impact of test execution on a database system, database change test system may test execute only those queries in a workload set that have changed execution plans due to the database changes that are being tested. By test executing only affected subset of queries in the workload set, database change test system reduces resource consumption of a database system used for testing the database changes. This feature, along with the feature of testing database changes without committing them to a database system, may make database change test system suitable for testing database changes on production database systems. With the capability to test database changes on production database systems, database change test system would yield more accurate results for performance metric for DBAs, and thus, may allow DBAs to make more knowledgeable decisions for committing the database changes.

Database Change Test System

FIG. 1 is a block diagram that depicts database change test system 100, in an embodiment. Database change test system 100 may include one or more database management systems (DBMSs), such as DBMS 150, described in more detail hereafter, specifically in "Database Management Systems" section. DBMS 150 may further include a database server, such as database server 155, to store and serve up database objects for the DBMS. A DBMS in database change test system 100 may be a test database management system, referred herein as "test DBMS" or a production database management system, referred here in as "production DBMS." In the production DBMS embodiment, database server 155 serves up data from DBMS 150 in response to a request of applications running in production. The execution of queries requested by such applications is referred here in as "production execution" of queries. On the other hand, in the test DBMS embodiment, database server 155 serves up data for testing purposes. For example, test DBMS 150 may be used by a DBA to develop and test a new query or to add new database objects to database server 155. Since database server 155 may be a replica of a production database server storing the same data and using the same schema to store the data, test DBMS 150 may be used to test queries that may eventually be executed on a production DBMS. However, in the embodiments herein, a production DBMS may also be used and referred as a test DBMS for purposes of test executions. According to such embodiments, although a test execution of a workload set occurs on a production DBMS, the database changes of the test execution are not committed on the production DBMS unless specifically requested by a DBA.

Query Execution

DBMS 150 may receive a query for execution on database server 155, in an embodiment. To execute the query, the DBMS may first convert the query into an execution plan.

As used herein, "execution plan" is an ordered set of operators used to access data in a database management system. Each operator may contain one or more data operations on an output data of another operator or on database objects. Query optimizer 140 receives a query as an input and generates an execution plan for the query, in an embodiment. Query optimizer 140 may include plan generator 143 that generates one or more alternative execution plans for the query. Plan generator 143 may generate those plans based on an analysis of access paths for database objects and operations described in the query. Based on the analysis, plan generator 143 may produce a permutation of execution plans. The differences in the execution plans may be based on: use of indexes or alternate and temporary database objects; order of operations; order of filters; order and type of join operators; scope of looping operators; nesting of operators; or caching of partial results.

For example, if a query contains "WHERE" clause with a filter for a particular value for a column of a table, plan generator 143 may generate various execution plans to access database objects of the table column for the query. If the column database object has no associated index, then plan generator 143 may generate a single execution plan using full table scan operator for the particular value on the column database object. However, if the column database object has associated indices, then plan generator 143 may generate two alternative execution plans: one using full table scan operator, as previously described, and another that utilizes the index scan for the particular value's index. Accordingly, the existence of an index on a column may affect the number of execution plans generated for a query. Thus, a database change, such as adding an index to a column may affect the choice of execution plans for a query, in an embodiment.

Other database changes may also affect the selection and order of operators for an execution plan of a query. As used herein, "database change" refers to any change that may cause a modification in an execution plan of a query. Examples of database changes, among others, include changes to execution plan parameter values as described in detail hereafter, changes to database objects of a DBMS such as index creation, changes to data statistics for database objects of a DBMS, changes to DBMS settings such as maximums of resource consumption or a DBMS storage configuration such as storage RAID level, etc.

In an embodiment, execution plan parameters 141 of query optimizer 140 may affect plan evaluator 145's selection of an optimal execution plan from the permutation of execution plans generated by plan generator 143 for a query. As used herein, "execution plan parameters" are settings for a query optimizer to use in evaluation of execution plans. Execution plan parameters may include execution cost of index lookup, size of main memory to use in execution and database object caching settings. Thus, an optimal plan is the execution plan that plan evaluator 145 predicts to have the least cost of system resources in execution on a DBMS based on execution plan parameters. In a related embodiment, plan evaluator 145 may evaluate each operator of an execution plan separately based on the order of operators. The query optimizer may then sum up the cost of system resources for each alternative execution plan to determine the optimal one that has the least cost.

Continuing with the previous example of the query that contains "WHERE" clause, plan generator 143 may have generated two alternative execution plans for the query: one in which a full table scan operator is selected for the table and another, in which an index scan operator is selected for the table. Plan evaluator 143 may select index scan operator as less costly because performing a search for a value on an indexed column uses less system resources. However, if execution plan parameters 141 contain an index look up cost parameter with a high value, the index scan may be evaluated to a higher cost. Accordingly, plan evaluator 145 may select the plan with the full table scan operator instead of the index scan execution plan. Plan evaluator 145 may also select full table scan, if the data statistics for that table indicates that the table has few rows, and execution plan parameters 141 indicate that the table may be fully loaded into main memory of database server 155.

In an embodiment, an execution plan parameter may be configured on a system level to affect any query execution plan generation in a query optimizer of a DBMS. When different queries are received by the DBMS through different sessions, an execution plan parameter configured on a system level may affect the execution plan of all queries generated by the query optimizer of the DBMS, even if the queries were received through different sessions. As used herein, "session" refers to a database session described in more detail in "Database Management Systems" section below.

In another embodiment, an execution plan parameter may be configured on a session level to affect any query execution plan generation by a query optimizer for a particular session of a DBMS. Thus, when different queries are received by the DBMS through different sessions, an execution plan parameter configured for the particular session may only affect the queries received by the DBMS through the particular session.

In yet another embodiment, an execution plan parameter may be configured to affect only a particular query's execution plan generation by a query optimizer of a DBMS. Thus, when different queries are received by the DBMS through different sessions, the query optimizer matches queries to the particular query, and if matched, the query optimizer is configured with an execution plan parameter for the particular query regardless over which session with the DBMS the query is received. In a related embodiment, execution plan parameters 141 may contain execution plan parameters on a system, session or query level. Query optimizer 140 may be configured appropriately based on the system level execution plan parameters, and then, depending on a session used and query to be executed, configured based on the execution plan parameters for the session and the query, respectively.

After selecting of an optimal execution plan for a query, database server 155 obtains and executes the execution plan, in an embodiment. Database server 155 parses the execution plan and performs instructions for each operator in the execution plan in the order specified by the execution plan to access data from database storage 157. The results of the execution may then be returned by DBMS 150 through the session that the query was received on.

In a test DBMS embodiment, a query may have different execution plan on a production DBMS than on test DBMS 150. If the same query that has been previously executed on the production DBMS is received by test DBMS 150 for execution, different execution plans may be generated for the query by query optimizer 140. The difference in the generated execution plans may be due to an existence of one or more additional database changes between test DBMS 150 and the production DBMS. For example, if query optimizer 140 has a different value for an execution plan parameter than query optimizer of the production DBMS or if there is less main memory available for caching of database objects, then the execution plans may differ. Similarly, differences in database objects (for example, due to lag in replication) may also produce a difference in data statistics. This difference in data statistics, in turn, may affect the query execution plan evaluation in plan evaluator 145 and plan evaluator 145 may select a different execution plan from a set of execution plans generated by plan generator 143 for the same query. Accordingly, these different execution plans may produce different performance metric for execution of the same query on test DBMS 150 versus the production DBMS.

SQL Performance Analyzer (SPA)

Database change test system may also contain SQL performance analyzer, in an embodiment. According to one embodiment, SPA 130 provides DBA with a tool for measuring and comparing performance of workload sets and various executions of queries in workload sets. SPA is described in "SQL Performance Analyzer", application Ser. No. 12/188,981, filed on Nov. 23, 2010 and granted, as U.S. Pat. No. 8,341,178 on Dec. 25, 2012, the entire contents of which are hereby incorporated by reference.

Workload Set

SPA 130 selects queries from workload set 131 for analyzing the performance of the queries, in an embodiment. A workload set is a collection of queries, execution plans of the queries and execution statistics associated with the execution of the execution plans. According to one embodiment, a workload set is stored as an SQL Tuning Set. SQL Tuning Sets are described in "SQL TUNING SETS", application Ser. No. 10/936,449, filed on Sep. 7, 2004, the entire contents of which are hereby incorporated by reference. An SQL Tuning Set is a persistent database object that stores one or more database query language statements and associated information for each statement. The associated information may include: execution statistics such as the number of buffer gets and elapsed times of the queries; data access statistics such as the number of rows fetched by the queries; and data related to execution context, such as bind values and optimizer parameter values for the queries. Additionally, the associated information may also include information that is relevant for comparative SQL analysis, such as the number of rows that was returned by the query.

According to one embodiment, a workload set is incrementally captured from queries that are executed on a production database system during a particular period of time (e.g., one hour, one day, one week, etc.). This way, a large percentage of queries that have actually been executed on the production database system is captured, thereby enabling SPA execution and analysis to be performed on a realistic set of queries. Queries that have been executed during different periods of time may also be captured into a single workload set. For example, queries that have been executed on a production database system during the business hours of Monday through Friday of a particular week may be captured into the same workload set. In other words, the queries that are captured into a single workload set need not have been executed contiguously in time. In addition, filtering may be performed during the capturing process so that only queries that meet specified filter conditions are captured. For example, filter conditions may specify that queries that are associated with a first application are to be captured into a first workload set while queries that are associated with a second application are to be captured into a second workload set. The filter conditions may be specified by DBAs. Finally, two or more workload sets may be combined into a single combined workload set, where SPA execution and analysis is performed on the combined workload set.

According to another embodiment, a workload set is built from a set of diagnostic traces that are captured from a production database system. According to yet another embodiment, a workload set is manually built by a DBA. With DBA-built workload sets, DBAs can specifically control and input the workload set that may be executed and analyzed by SPA.

According to another embodiment, an original workload set may be used to generate a new workload set through execution of queries in the original workload set under changed conditions in a DBMS. When database changes occur in the DBMS, execution plan of a particular query may change. Based on change in execution plan of the particular query, the execution of the query may produce different statistics. Similarly, database changes may affect more than query execution plans in a workload set. Queries of the workload set may be executed, and the execution may be captured in a new workload set. The new workload set may contain the same queries as the original workload set, however the execution plans and statistics associated with the queries may have changed. In a related embodiment, SPA 130 may execute queries from workload set 131 to generate new workload sets that may be then compared with workload set 131.

Any workload set, including workload sets captured, built, or generated according to the approaches just described, may be provided to SPA 130 for execution and analysis.

Test Profile

SPA 130 may establish a database session with DBMS 150, to request execution of queries from a workload set, in an embodiment. To configure test execution of queries through the established session, SPA 130 may load test profile 120 that is stored in persistent storage. Test profile 120 may be stored in the persistent storage in a variety of data formats. For example, test profile 120 may be in XML format with different XML schemas, in name-value pair format, in a proprietary or standard data structure or in a database table. However, the exact data format or combination of data formats used to store test profile 120 is not critical to the techniques described herein.

Test profile 120 may include execution plan test parameters 121 and query test restrictions 123. SPA 130 may configure DBMS's system level, session level and query level execution plan parameters, described above, based on the execution plan test parameters 121. However, on a DBMS that executes production queries, configuring system and query level execution plan parameters may affect the production execution of queries. In a production DBMS embodiment, to ensure that test execution of queries using test profile 120 does not affect production execution of queries, SPA 130 may only emulate configuring the system level parameters of a DBMS with execution plan test parameters 121. When SPA 130 establishes a database session with DBMS 150, if execution plan test parameters 121 contain system level parameters, then SPA 130 may configure the DBMS only for the connected session with system level parameters of execution plan test parameters 121. Thus, the test profile configured parameters may only affect the established session with SPA 130 rather than affecting the DBMS 150's other sessions. Accordingly, production execution of queries through other sessions with DBMS 150 would not be affected by the system level parameters configured by SPA 130 from execution plan test parameters 121.

Similarly, according to the embodiment, if execution plan test parameters 121 contains query level execution plan parameters, then SPA 130 may configure the DBMS only for the connected session with query level parameters of execution plan test parameters 121. Thus, the test profile configured parameters may only affect the established session with SPA 130 rather than affecting other sessions of DBMS 150's. Accordingly, execution of queries through the other sessions with DBMS 150 would not be affected by the query level parameters configured by SPA 130 from execution plan test parameters 121.

Query executor 133, a component of SPA 130, may be configured to request a DBMS to execute queries from workload set 131 in a session with DBMS 150, in an embodiment. Upon the request for a query execution, query optimizer 140 may generate the execution plan for the query. The execution plans are then executed by database server 155 to access database objects from database storage 157. In a related embodiment, query executor 133 may obtain execution plans generated by query optimizer of DBMS 150 for the query and store it in before-change workload set 132. For example, within a SPA 130 session with DBMS 150, query executor 133 may issue an "EXPLAIN" command for each query in workload set 131. In response to such command, query optimizer 140 may generate and return the execution plans for each of the queries, which may be captured by query executor 133 in before-change workload set 132. In a related embodiment, before-change workload set 132 may include the execution statistics for the execution of the execution plans in before-change workload set 132.

After the session with DBMS 150 is configured based on execution plan test parameters 121 of test profile 120, execution plans of queries on DBMS 150 may change, in an embodiment. Query executor 133 may request DBMS 150 to generate the new execution plans for queries in workload set 131 after session configuration by SPA 130. Query executor 133 may store the after execution plans in after-change workload set 134 in persistent storage. In a related embodiment, using an established session that is configured with execution plan test parameters 121, query executor 133 may request DBMS 150 to execute queries in workload set 131 and capture the new execution plans along with execution statistics in after-change workload set 134.

In an embodiment, query executor 133 may request a DBMS to execute queries according to query test restrictions 123 in test profile 120. SPA 130 may establish a session with DBMS 150, and query executor 133 may connect to the DBMS using the session to execute queries according to the test restrictions from query test restrictions 123. In a related embodiment, query executor 133 may request execution of queries from workload set 131 or any other workload set accessible by SPA 130 according to the query test restrictions.

Query test restrictions 123 may include settings for test execution of queries on DBMS 150, in an embodiment. The settings may control various aspects of test execution of queries such as the duration, time and date, or mode of the test execution of workload set 131. In a related embodiment, execution settings may include "changed plan execution only" setting. When this setting is enabled, query executor 133 is configured to execute only the queries in workload set 131 that have different execution plans for before and after session configuration. Query executor 133 may examine execution plans of before-change workload set 132 and after-change workload set 134 for each query in workload set 131 and then execute only those queries that have difference in the plans. In the production DBMS embodiment, when changed plan execution only setting is enabled, test execution of queries takes much less system resources from production execution of queries because only a subset of queries from workload set 131 may be selected for execution.

In an embodiment, query test restrictions 123 may also include execution time limits. Execution time limits may be used by SPA 130 to control the resource consumption for test executing queries in workload set 131 on DBMS 150. The need for controlling resource consumption is especially acute for the production DBMS embodiment. SPA 130 may limit system resource consumption for execution of queries from workload set 131 by configuring query executor 133 with execution time limits from query test restrictions 123.

In a related embodiment, query executor 133 may be configured by query test restriction 123 to limit execution time of a query and/or limit execution of a workload set. Query test restriction 123 includes query execution time limit for limiting an execution time of a query and workload execution time limit for limiting a total execution time of queries in a workload set. Query executor 133 may track the time for an execution of each query from workload set 131 or 132 or 134 on DBMS 150. As soon as the tracked query execution time for a query reaches the query execution time limit, query executor 133 may abort the query execution on the DBMS and identify the query as timed out. Similarly, query executor 133 may track the total time for an execution of a workload set on DBMS 150. As soon as the tracked total time reaches the workload execution time limit for the queries in the workload set, query executor 133 may abort all executions of queries that have not been yet executed and identify the queries as non-executed. Therefore, a subset of queries, or any query for that matter, in the workload set may not be test executed.

Query test restrictions 123 may also include one or more performance metrics that performance monitor 135 may track for an execution of a query, in an embodiment. A performance metric is any metric that measures execution of a query on a DBMS in terms of time and/or system resource consumed. Examples of a performance metric may be elapsed time, CPU time, buffer gets, disk reads, direct writes and optimizer cost for a query execution. However, the exact performance metric used to measure execution of a query is not critical to the techniques described herein.

Performance monitor 133 monitors the performance metrics specified in the query test restrictions for an execution of a query initiated by query executor 133. In a related embodiment, query test restrictions 123 may specify a performance metrics that is a combination of two or more performance metrics. According to such embodiment, performance monitor 133 may monitor an execution of a query for the two or more performance metrics and then combine the two or more performance metrics as prescribed by query test restrictions 133.

Report generator 137 may generate a report for execution of queries from workload set 131 on a DBMS according to test profile 120, in an embodiment. For each query from workload set 131, report generator 137 may obtain execution information from query executor 133 and performance monitor 135. Query executor may provide information on whether a query has been executed on the DBMS or has been identified as non-executed or timed out. Performance monitor 135 may provide the performance metrics about the executed queries. Report generator 137 may combine the information from query executor 133 and performance monitor 137 into a report. The report may identify each query from workload set 131 as executed, non-executed or timed out, and may provide performance metric for the executed queries according to test profile 120. In a related embodiment, the report may also contain original performance metric information from workload set 131.

In an embodiment, report generator 137 may also report different execution plans and their comparison for queries in workload set 131, 132 and 134. For example, report generator 137 may report the original execution plans for workload set 131 that have been recorded into the workload set 131 at the time of the capture of queries into the workload set. Report generator 137 may also load from persistent storage workload set 132 and 134 to report the before and after session configuration execution plans for queries in workload set 131, respectively. Accordingly, report generator 137 may compare the original, before and after session configuration execution plans and report the comparison for each of the queries in workload set 131.

SPA 130 may also provide an interface for modifying test profile 120, in an embodiment. SPA 130 may load test profile 120 from persistent storage and display it to a DBA. DBA may make one or more modifications to the profile and save the changes to test profile 120. For example, DBA may modify query test restrictions 123 by modifying performance metrics collected and reported, changing modes of test execution, or setting execution time limits for a query or a workload. Similarly, DBA may modify the execution plan test parameters to test changes to execution plan parameters in test execution of queries. DBA may then save the changes by storing changed test profile 120 in persistent storage.

In an embodiment, SPA 130 may provide an interface for a DBA to request to test changes and view reports. Using SPA 130's may include a user interface, which may be textual or graphical. Using the interface, a DBA may select a stored test profile and a workload set(s) to test changes against DBMS 150. The changes may be any database changes discussed herein such as changes made to the test profile or execution plans in the workload set(s). The interface may provide for a DBA to request SPA 130 to load the test profile, establish session with DBMS 150, execute the selected workload sets and then, generate a report(s) to analyze. In a related embodiment, the interface may provide a single action input for DBA to initiate a generation of the report for testing the changes. DBA may select the test profile and the workload set(s) and then, perform a single user action on the interface of SPA 130. In response to receiving the single action input from the DBA, SPA 130 may establish a session with DBMS 150, load the selected test profile, request an execution of execution plans or queries from the selected workload set(s), collect statistics, compile the report for the test of the changes and display the report on the interface for the DBA to analyze.

Each of SPA 130 and each of its components: workload set 131, before-change workload set 132, after-change workload set 134, query executor 133, performance monitor 135, report generator 137, test profile 120 and each of test profile 120's components: execution plan test parameters 121 and query test restrictions 123 are part of computer system and may be implemented in software, hardware, or a combination of software and hardware. For example, SPA 130 may be implemented using stored program logic.

Similarly, each of DBMS 150 and each of its components: database server 155, database storage 157, query optimizer 140 and each of query optimizer 140's components: execution plan parameters 141, plan generator 143 and plan evaluator 145 are part of computer system and may be implemented in software, hardware, or a combination of software and hardware. For example, DBMS 150 may be implemented using stored program logic.

Test Executing Workload Set

Figure 2:
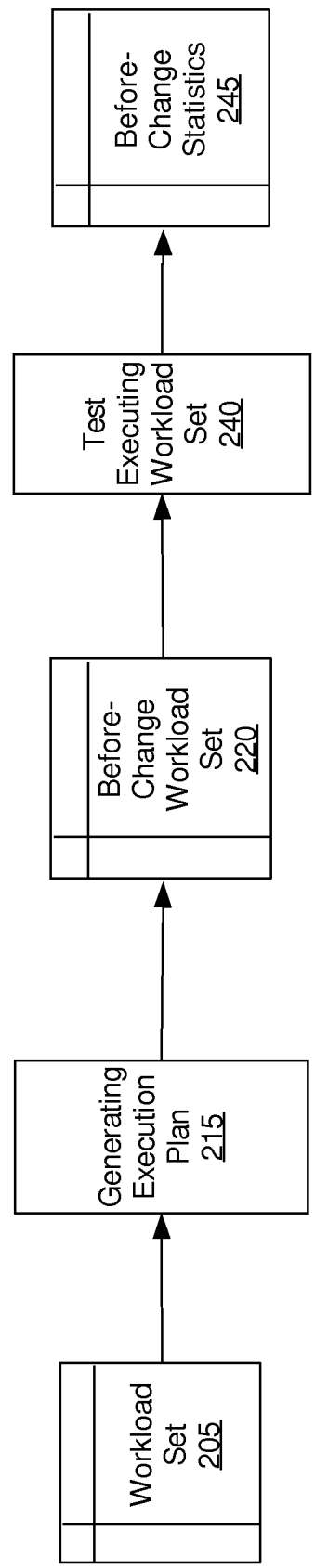
FIG. 2 is a process diagram that depicts program logic for test executing queries in a workload set to generate statistics before a database change, according to an embodiment.
Figure 3:
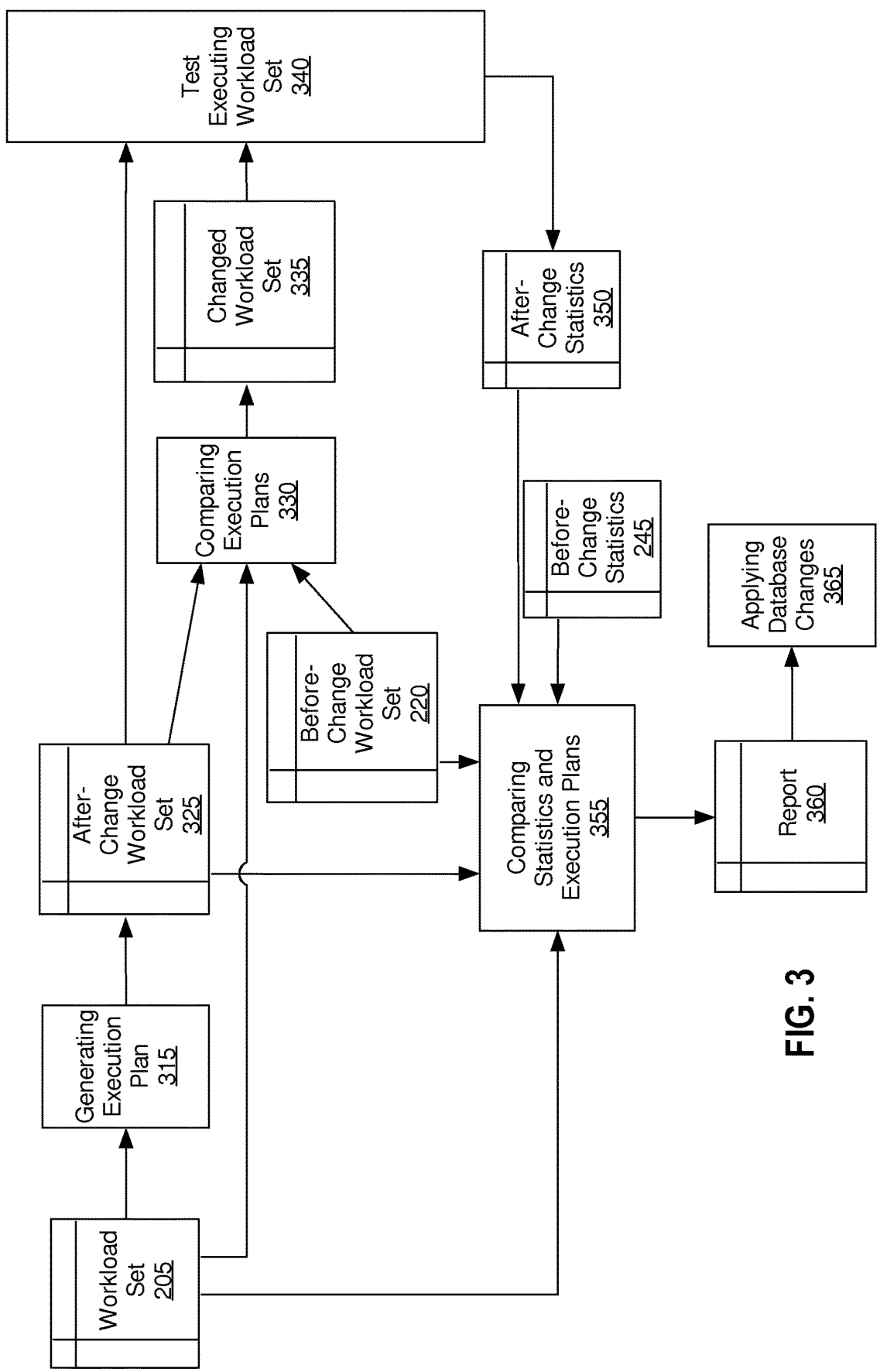
FIG. 3 is a process diagram that depicts program logic for test executing queries in a workload set to test and apply database changes, according to an embodiment.

FIGS. 2 and 3 are process diagrams that depict program logic for test executing queries in a workload set, in an embodiment. Workload set 205 may include one or more queries as well as the original execution plans and execution statistics collected at the time of the execution and capture of the queries into the workload set.

To determine changes in execution statistics and execution plans of queries in a workload set caused by database changes, before-change execution plans and statistics may be obtained, in an embodiment. FIG. 2 depicts program logic for collecting initial performance metrics for test executing queries in a workload set before any database changes are made to a DBMS. In step 215, execution plans for queries in workload set 205 may be generated by the DBMS and captured in before-change workload set 220. In step 240, queries or execution plans from before-change workload set 220 are executed on the DBMS. The execution statistics based on performance metrics may be collected while test executing queries or execution plans of queries in step 240 producing before-change statistics 245.

Step 215 of generating execution plan may be requested by query executor 133 and performed by query optimizer 140; step 240 of test executing may be requested by query executor 133; performed by database server 155 and monitored for performance metrics by performance monitor 135, in an embodiment.

FIG. 3 depicts program logic for test executing queries in a workload set after database changes to obtain report on the effects of the database changes, in an embodiment. After database changes to a DBMS, in step 315, execution plans for queries in workload set 205 may be generated by the DBMS and captured in after-change workload set 325. In step 340, after-change workload set 325 is test executed on the DBMS. The execution statistics based on performance metrics may be collected while test executing the queries or execution plans of the queries in step 340 producing after-change statistics 350.

In an alternative embodiment, such as the production DBMS embodiment, only execution plans that have changed after database changes are executed in step 340, and the execution plans that have stayed the same may be prevented from being executed in step 340. In one embodiment, the changed workload set 335 is determined by comparing the original execution plans from workload set 205 with the execution plans from after-change workload set 325 in step 330. In another embodiment, the changed workload set 335 is determined by comparing the execution plans from before-change workload set 220 with the execution plans from after-change workload set 325 in step 330. The execution plans that are determined to be different for the same queries, in step 330, may be included in changed workload set 335. However, the execution plans that are determined to be unchanged for the same queries, in step 330, may be prevented to be included in changed workload set 335. The execution plans from changed workload set 335 may then be executed in step 340, and execution statistics collected in after-change statistics 350. In a related embodiment, performing step 330 to generate changed workload set 335 may depend on a changed plan execution only setting. If the setting is enabled, step 330 may be performed, otherwise all execution plans of after-change workload set may be executed in step 340.

In the production DBMS embodiment, test executing only queries with the execution plans that have been affected by database changes may substantially reduce the DBMS resource consumption by test execution of queries. As discussed herein, the production DBMS may have an ongoing production execution of queries, and test execution of execution plans such as in step 340, may take away DBMS's system resources from the production execution. DBA's would prefer to avoid negatively affecting the production execution by the test execution, therefore, the alternative embodiment, where only a subset of queries' execution plans in after-change workload set 325 is executed, may reduce the DBMS resource consumption by the test execution, and after-change statistics 350 may contain the gathered performance metrics for only the queries in changed workload set 335.

However, in the test DBMS embodiment, test executing all queries in a workload set may provide DBA a more complete report on the effect of database changes on the workload set. In the embodiment, where in step 340, execution plans from all queries in after-change workload set 325 are executed, after-change statistics 350 may contain the execution statistics for all queries in after-change workload set 325, which corresponds to all queries in workload set 205.

In an embodiment, in step 355 the statistics captured in workload set 205 may be compared with after-change statistics 350 to generate report 360. The comparison may yield a report as to the effects of database changes on the execution of queries in workload set 205. Report 360 may be particularly accurate when workload set 205 has been collected on the same DBMS as the test-execution that yielded after-change statistics 350. For example in the production DBMS embodiment, if the test execution of queries from workload set 205 occurs soon after the workload set 205 has been captured, then comparing after-change statistics 350 and statistics in workload set 205 may yield an accurate report 360 on the impact of database changes. Similarly, comparing the execution plans from workload set 205 and after-change workload set 325 for the same queries may yield an accurate report 360 about which of the queries had their execution plans changed due to the database changes.

In a related embodiment, where the steps in FIG. 2 have been executed, before-change workload 220 and before-change statistics 245 may provide a more accurate baseline for comparing with after-change workload 325 and after-change statistics 350, respectively, for generating report 360. Since the steps in FIG. 2 may be executed as part of the test execution for database changes in private session, additional database changes are unlikely to occur before generating execution plans in step 315 and test executing workload set in step 340. For similar reasons, before-change workload set 220 execution in 240 consumes similar DBMS resources as after-change workload set 325 execution or changed workload set 335 execution in step 340. Thus, the difference in the collected performance metrics for after-change statistics 350 and before-change statistics 245 may be mostly due to database changes that are being tested.

In another related embodiment, execution plans from before-change workload set 220 may be compared with execution plans of workload set 205 for the same queries in step 355. The comparison may identify the queries that have different execution plans and highlight those queries in report 360. The difference in execution plans for the same query may denote that the comparison between before-change statistics 245 and after-change statistics 350 in step 355 may not likely be accurate as additional database changes have affected the execution of the query. Thus, any improvement (or degradation) in performance metrics of the query may not necessarily occur in a DBMS in which the query initially has been captured in workload set 205 because of the existence of additional database changes affecting execution plans that are not part of database changes for which the query is test executed.

A reason for the difference in the execution plans may be that the test execution of queries in workload set 205 is performed on a different DBMS than the DBMS, on which workload set 205 queries were captured. For example, workload set 205 may have been collected on a production DBMS, however the test execution may have been performed on a test DBMS which is a copy of the production DBMS. The difference in an execution plan for a query between the production DBMS and the test DBMS may denote that additional database changes exist between the production DBMS and the test DBMS, which affect the execution plan of the query. Thus, the change in performance metrics collected during test execution of the query on the test DBMS may not be applicable to the production DBMS.

In an embodiment, report 360 includes after-change statistics 350, before-change statistics 245, statistics from workload set 205 or any combination of thereof. After examining report 360, DBA may then request to apply the database changes to a DBMS. In step 365, the database changes requested by DBA may be applied to the DBMS, in an embodiment. In a related embodiment, based on comparison of statistics, SPA 130 may itself determine to apply database changes and request DBMS 150 to apply them.

Step 315 of generating execution plan may be requested by query executor 133 and performed by query optimizer 140; step 330 of comparing execution plans may be performed by report generator 137; step 340 of test executing may be requested by query executor 133; performed by database server 155 on database storage 157 and monitored for performance metrics by performance monitor 135; step 355 of comparing statistics and execution plans may be performed by report generator 137; and step 365 may be requested by SPA 130 and performed by DBMS 150, in an embodiment.

Database Management Systems

A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database. Although the embodiments of the invention are described herein using the term "SQL", the invention is not limited to just this particular database query language, and may be used in conjunction with other database query languages and constructs.

A client may issues a series of requests, such as requests for execution of queries, to a database server by establishing a database session, referred herein as "session." A session comprises a particular connection established for a client to a database server, such as a database instance, through which the client may issues the series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
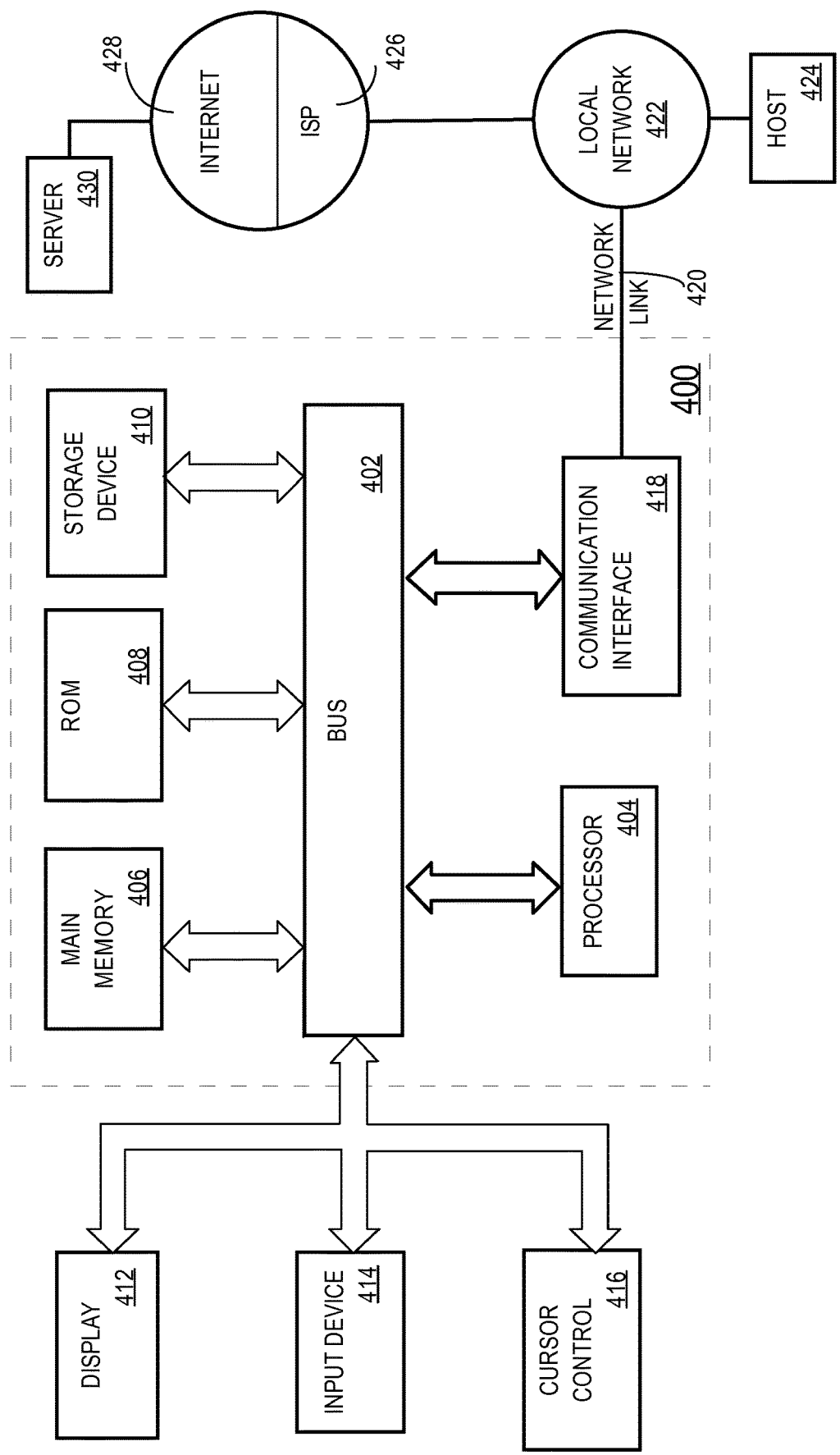
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Cloud Computing Overview

The techniques described herein are implemented using one or more processing solutions, examples of which include distributed systems, clustered computing systems, and cloud computing systems. In an embodiment, database change test system 100 is part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or the whole of) the functionality attributed to database change test system 100, or to other entities within this description, is controllable via an interface that is exposed at a cloud computing system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
    storing a query test profile in persistent storage, said query test profile specifying:
        query test restrictions,
        execution plan parameters, said execution plan parameters indicating how to generate execution plan operators for query execution plans;
    storing a workload set of queries in the persistent storage;
    establishing a session with a database management system, wherein the database management system is configured with a first initial parameter value for a first execution plan parameter and with a second initial parameter value for a second execution plan parameter;
    retrieving the query test profile, the query test profile includes a plurality of changes to the database management system comprising:
        a configuration for system-level parameters to modify the first execution plan parameter to a first changed parameter value, different from the first initial parameter value, and
        a configuration for session-level parameters to modify the second execution plan parameter to a second changed parameter value, different from the second initial parameter value;
    wherein the first execution plan parameter and the second execution plan parameter are used in execution plan generation of at least one query of a plurality of queries in the workload set;
    configuring the session according to the query test profile thereby generating a configured version of the session that causes queries executed within the configured version of the session to be executed according to both the configuration for system-level parameters and the configuration for session-level parameters;
    receiving, through the configured version of the session, a first user input requesting to execute the workload set; and
    test executing, through the configured version of the session, each query in the plurality of queries of the workload set according to the query test profile;
    wherein the test executing, through the configured version of the session, causes simulating the plurality of changes within the configured version of the session by:
        applying the configuration for system-level parameters to the database management system thereby:
            modifying the first execution plan parameter, from the first initial parameter value, to the first changed parameter value; and
            based on the first changed parameter value of the first execution plan parameter, affecting an execution plan of the at least one query in the workload set for the configured version of the session and other con-current sessions that are different from the configured version of the session,
        applying the configuration for session-level parameters to the database management system thereby:
            modifying the second execution plan parameter, from the second initial parameter value, to the second changed parameter value; and
            based on the second changed parameter value of the second execution plan parameter, further affecting the execution plan of the at least one query of the plurality of queries in the workload set for the configured version of the session without affecting one or more other execution plans of one or more respective queries that are executed through other one or more sessions with the database management system that are different from the configured version of the session, and
        the database management system test executing the at least one query based on the first changed parameter value of the first execution plan parameter, rather than the first initial parameter value, of the first execution plan parameter and the second changed parameter value, rather than the second initial parameter value, of the second execution plan parameter;
    receiving, over a particular session with the database management system that is concurrent to the configured version of the session, a particular query to execute on the database management system;

the database management system executing the particular query, received over the particular session with the database management system, based on the first changed parameter value, rather than the first initial parameter value, of the first execution plan parameter and the second initial parameter value, rather than the second changed parameter value, of the second execution plan parameter.

2. The method in claim 1, wherein the database management system is a production database management system.

3. The method in claim 1, wherein:
the database management system includes system parameters indicating how to generate execution plan operators in two or more sessions of the database management system;
said execution plan parameters include one or more system parameters; and
the method further comprises configuring the session with said one or more system parameters without configuring other sessions of the database management system with said one or more system parameters.

4. The method in claim 1, wherein:
the database management system includes query parameters indicating how to generate execution plan operators for a particular query in two or more sessions of the database management system;
said execution plan parameters include one or more query parameters; and
the method further comprises configuring the session with said one or more query parameters without configuring other sessions of the database management system with said one or more query parameters.

5. The method in claim 1, further comprising:
before a database change is made, generating a first set of one or more execution plans for the workload set of queries without the query test profile;
wherein the test executing the plurality of queries according to the query test profile further comprises, after the databases change is made, generating a second set of one or more execution plans for the workload set of queries according to the query test profile
comparing the first set of one or more execution plans with the second set of one or more execution plans; and
based on the comparing the first set of one or more execution plans with the second set of one or more execution plans, test executing at least part of the workload set of queries without test executing at least another part of the workload set of queries.

6. The method in claim 5, further comprising:
based on the comparing the first set with the second set, determining one or more queries of the workload set of queries that have a change in their execution plan from the first set to the second set.

7. The method in claim 1, further comprising:
obtaining, from the query test profile, which performance metrics to monitor;
monitoring the performance metrics for one or more queries of the plurality of queries that are test executed according to the query test profile; and
reporting execution statistics based on the monitoring the performance metrics for the one or more queries.

8. The method in claim 1, wherein test executing the plurality of queries according to the query test profile comprises:
obtaining a time limit from the query test profile;
test executing the plurality of queries until the time limit is reached, wherein a first subset of the plurality of queries, that completes test executing before the time limit is reached, is identified as completed queries and a second subset of the plurality of queries that does not complete before the time limit is reached, is identified as incomplete queries; and
reporting execution statistics, according to the query test profile, for the completed queries.

9. The method in claim 1, further comprising:
obtaining a set of time limits, from the query test profile, for two or more queries from the workload set of queries;
test executing each query of the two or more queries until a corresponding time limit in the set of time limits is reached, wherein a third subset of the two or more queries, that completes test executing before respective time limits of the third subset are reached, is identified as test executed queries and a second subset of the workload set of queries that does not complete before respective time limits of the second subset are reached, is identified as timed out queries; and
reporting execution statistics, according to the query test profile, for the test executed queries.

10. The method in claim 5, wherein a database change comprises of one or more changes to execution plan parameters of the database management system, changes to data statistics for database objects of the database management system, changes to settings of said database management system, or changes to storage configuration of said database management system.

11. The method of claim 1:
wherein the query test profile is stored before said establishing the session; and
wherein said establishing the session, said retrieving the query test profile, said configuring the session and said test executing the plurality of queries, are performed in response to said receiving the first user input; and
wherein the first user input is a single action on a user interface.

12. One or more non-transitory storage media storing instructions which, when executed by one or more computing devices, cause:
storing a query test profile in persistent storage, said query test profile specifying: query test restrictions,
execution plan parameters, said execution plan parameters indicating how to generate execution plan operators for query execution plans;
storing a workload set of queries in the persistent storage;
establishing a session with a database management system, wherein the database management system is configured with a first initial parameter value for a first execution plan parameter and with a second initial parameter value for a second execution plan parameter;
retrieving the query test profile, the query test profile includes a plurality of changes to the database management system comprising:
a configuration for system-level parameters to modify the first execution plan parameter to a first changed parameter value, different from the first initial parameter value, and
a configuration for session-level parameters to modify the second execution plan parameter to a second changed parameter value, different from the second initial parameter value;

wherein the first execution plan parameter and the second execution plan parameter are used in execution plan generation of at least one query of a plurality of queries in the workload set;

configuring the session according to the query test profile thereby generating a configured version of the session that causes queries executed within the configured version of the session to be executed according to both the configuration for system-level parameters and the configuration for session-level parameters;

receiving, through the configured version of the session, a first user input requesting to execute the workload set; and test executing, through the configured version of the session, each query in the plurality of queries of the workload set according to the query test profile;

wherein the test executing, through the configured version of the session, causes simulating the plurality of changes within the configured version of the session by:

applying the configuration for system-level parameters to the database management system thereby:

modifying the first execution plan parameter, from the first initial parameter value, to the first changed parameter value; and based on the first changed parameter value of the first execution plan parameter, affecting an execution plan of the at least one query in the workload set for the configured version of the session and other con-current sessions that are different from the configured version of the session, applying the configuration for session-level parameters to the database management system thereby:

modifying the second execution plan parameter, from the second initial parameter value, to the second changed parameter value; and based on the second changed parameter value of the second execution plan parameter, further affecting the execution plan of the at least one query of the plurality of queries in the workload set for the configured version of the session without affecting one or more other execution plans of one or more respective queries that are executed through other one or more sessions with the database management system that are different from the configured version of the session, and the database management system test executing the at least one query based on the first changed parameter value of the first execution plan parameter, rather than the first initial parameter value, of the first execution plan parameter and the second changed parameter value, rather than the second initial parameter value, of the second execution plan parameter;

receiving, over a particular session with the database management system that is concurrent to the configured version of the session, a particular query to execute on the database management system;

the database management system executing the particular query, received over the particular session with the database management system, based on the first changed parameter value, rather than the first initial parameter value, of the first execution plan parameter and the second initial parameter value, rather than the second changed parameter value, of the second execution plan parameter.

13. The one or more non-transitory storage media of claim 12, wherein the database management system is a production database management system.

14. The one or more non-transitory storage media of claim 12, wherein:

the database management system includes system parameters indicating how to generate execution plan operators in two or more sessions of the database management system;

said execution plan parameters include one or more system parameters; and the instructions include a set of instructions which, when executed by the one or more computing devices causes configuring the session with said one or more system parameters without configuring other sessions of the database management system with said one or more system parameters.

15. The one or more non-transitory storage media of claim 12, wherein:

the database management system includes query parameters indicating how to generate execution plan operators for a particular query in two or more sessions of the database management system;

said execution plan parameters include one or more query parameters; and the instructions include a set of instructions which, when executed by the one or more computing device causes configuring the session with said one or more query parameters without configuring other sessions of the database management system with said one or more query parameters.

16. The one or more non-transitory storage media of claim 12, wherein the instructions include a set of instruction which, when executed by the one or more computing devices causes:

before a database change is made, generating a first set of one or more execution plans for the workload set of queries without the query test profile;

wherein the test executing the plurality of queries according to the query test profile further comprises, after the databases change is made, generating a second set of one or more execution plans for the workload set of queries according to the query test profile comparing the first set of one or more execution plans with the second set of one or more execution plans; and based on the comparing the first set of one or more execution plans with the second set of one or more execution plans, test executing at least part of the workload set of queries without test executing at least another part of the workload set of queries.

17. The one or more non-transitory storage media of claim 16, wherein the instructions include a set of instructions which, when executed by the one or more computing devices causes:

based on the comparing the first set with the second set, determining one or more queries of the workload set of queries that have a change in their execution plan from the first set to the second set.

18. The one or more non-transitory storage media of claim 12, wherein the instructions include a set of instructions which, when executed by the one or more computing devices causes:

obtaining, from the query test profile, which performance metrics to monitor;

monitoring the performance metrics for one or more queries of the plurality of queries that are test executed according to the query test profile; and reporting execution statistics based on the monitoring the performance metrics for the one or more queries.

19. The one or more non-transitory storage media of claim 12, wherein the instructions include a set of instructions which, when executed by the one or more computing devices causes:
obtaining a time limit from the query test profile;
test executing the plurality of queries until the time limit is reached, wherein a first subset of the plurality of queries, that completes test executing before the time limit is reached, is identified as completed queries and a second subset of the plurality of queries that does not complete before the time limit is reached, is identified as incomplete queries; and
reporting execution statistics, according to the query test profile, for the completed queries.

20. The one or more non-transitory storage media of claim 12, wherein the instructions include a set of instructions which, when executed by the one or more computing devices causes:
obtaining a set of time limits, from the query test profile, for two or more queries from the workload set of queries;
test executing each query of the two or more queries until a corresponding time limit in the set of time limits is reached, wherein a third subset of the two or more queries, that completes test executing before respective time limits of the third subset are reached, is identified as test executed queries and a second subset of the workload set of queries that does not complete before respective time limits of the second subset are reached, is identified as timed out queries; and
reporting execution statistics, according to the query test profile, for the test executed queries.

21. The one or more non-transitory storage media of claim 16, wherein a database change comprises of one or more changes to execution plan parameters of the database management system, changes to data statistics for database objects of the database management system, changes to settings of said database management system, or changes to storage configuration of said database management system.

22. The one or more non-transitory storage media of claim 12:
wherein the query test profile is stored before said establishing the session; and
wherein said establishing the session, said retrieving the query test profile, said configuring the session and said test executing the plurality of queries, are performed in response to said receiving the first user input; and
wherein the first user input is a single action on a user interface.

23. The method of claim 1, further comprising:
detecting, through the configured version of the session, the existence of the configuration for system-level parameters;
modifying the configuration for session-level parameters to include the configuration for system-level parameters;
receiving, through the configured version of the session, a second user input requesting to execute the workload set; and
test executing, through the configured version of the session, each query in the plurality of queries of the workload set according to the query test profile;
wherein the test executing, through the configured version of the session, causes simulating the plurality of changes within the configured version of the session by:
applying the configuration for session-level parameters to the database management system, without the configuration for system-level parameters, thereby:
modifying the first execution plan parameter, from the first initial parameter value, to the first changed parameter value and the second execution plan parameter, from the second initial parameter value, to the second changed parameter value; and
based on the first changed parameter value of the first execution plan parameter and on the second changed parameter value of the second execution plan parameter, affecting the execution plan of the at least one query in the workload set for the configured version of the session without affecting one or more other execution plans of one or more respective queries that are executed through other one or more sessions with the database management system that are different from the configured version of the session, and
the database management system test executing the at least one query based on the first changed parameter value of the first execution plan parameter, rather than the first initial parameter value, of the first execution plan parameter and the second changed parameter value, rather than the second initial parameter value, of the second execution plan parameter;
receiving, over a certain session with the database management system that is concurrent to the configured version of the session, a certain query to execute on the database management system;
the database management system executing the certain query, received over the certain session with the database management system, based on the first initial parameter value, rather than the first changed parameter value, of the first execution plan parameter and the second initial parameter value, rather than the second changed parameter value, of the second execution plan parameter.

24. The one or more non-transitory storage media of claim 12, wherein the instructions include a set of instructions which, when executed by the one or more computing devices causes:
detecting, through the configured version of the session, the existence of the configuration for system-level parameters;
modifying the configuration for session-level parameters to include the configuration for system-level parameters;
receiving, through the configured version of the session, a second user input requesting to execute the workload set; and
test executing, through the configured version of the session, each query in the plurality of queries of the workload set according to the query test profile;
wherein the test executing, through the configured version of the session, causes simulating the plurality of changes within the configured version of the session by:
applying the configuration for session-level parameters to the database management system, without the configuration for system-level parameters, thereby:

modifying the first execution plan parameter, from the first initial parameter value, to the first changed parameter value and the second execution plan parameter, from the second initial parameter value, to the second changed parameter value; and based on the first changed parameter value of the first execution plan parameter and on the second changed parameter value of the second execution plan parameter, affecting the execution plan of the at least one query in the workload set for the configured version of the session without affecting one or more other execution plans of one or more respective queries that are executed through other one or more sessions with the database management system that are different from the configured version of the session, and the database management system test executing the at least one query based on the first changed parameter value of the first execution plan parameter, rather than the first initial parameter value, of the first execution plan parameter and the second changed parameter value, rather than the second initial parameter value, of the second execution plan parameter;

receiving, over a certain session with the database management system that is concurrent to the configured version of the session, a certain query to execute on the database management system;

the database management system executing the certain query, received over the certain session with the database management system, based on the first initial parameter value, rather than the first changed parameter value, of the first execution plan parameter and the second initial parameter value, rather than the second changed parameter value, of the second execution plan parameter.

* * * * *

UNITED STATES PATENT AND TRADEMARK OFFICE
CERTIFICATE OF CORRECTION

PATENT NO.         : 10,621,064 B2
APPLICATION NO.    : 14/325209
DATED              : April 14, 2020
INVENTOR(S)        : Gongloor et al.

Page 1 of 1

It is certified that error appears in the above-identified patent and that said Letters Patent is hereby corrected as shown below:

In the Claims

In Column 22, Line 27, in Claim 15, delete "device" and insert -- devices --, therefor.

In Column 22, Line 33, in Claim 16, delete "instruction" and insert -- instructions --, therefor.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*